(12) United States Patent
Lohkamp

(10) Patent No.: US 6,550,693 B2
(45) Date of Patent: Apr. 22, 2003

(54) COATING APPARATUS AND METHOD OF USE

(75) Inventor: Mark R. Lohkamp, Rochester, NY (US)

(73) Assignee: Wilevco, Inc., Billerica, MA (US)

( * ) Notice: Subject to any disclaimer, the term of this patent is extended or adjusted under 35 U.S.C. 154(b) by 15 days.

(21) Appl. No.: 09/852,504

(22) Filed: May 10, 2001

(65) Prior Publication Data

US 2001/0040193 A1 Nov. 15, 2001

Related U.S. Application Data

(60) Provisional application No. 60/202,893, filed on May 10, 2000.

(51) Int. Cl.$^7$ ................................................ B05B 3/10
(52) U.S. Cl. ........................................ 239/223; 239/500
(58) Field of Search ............................. 239/319, 225.1, 239/700, 703, 240, 246, 500, 222.11, 222.13, 222.21, 223, 224, 382, 383, 523

(56) References Cited

U.S. PATENT DOCUMENTS

| | | | |
|---|---|---|---|
| 3,961,755 A | | 6/1976 | Morine et al. |
| 4,018,367 A | | 4/1977 | Morine et al. |
| 4,043,294 A | | 8/1977 | Morine et al. |
| 4,058,083 A | | 11/1977 | Miller |
| 4,221,332 A | * | 9/1980 | Bals ........................ 239/223 |
| 5,478,583 A | | 12/1995 | Jarrett et al. |
| 5,575,848 A | | 11/1996 | Chedville |
| 5,865,890 A | | 2/1999 | Makujina |

OTHER PUBLICATIONS

Arcall Brochure, "Arcall CMF Coating Machines," (<see www.arcall.co.uk>) (no date).
Arcall Brochure, "Arcall FS: Innovative Applications Systems," (<see www.arcall.co.uk>) (no date).
Arcall Brochure, "Arcall 600i Technology; A revolution in spinning disc spray technology," (<see www.arcall.co.uk>) (no date).
Arcall Brochure, "Arcall 900 Cracker Oiler," (<see www.arcall.co.uk>) (no date).
Arcall Brochure, "Arcall Trunking," (<see www.arcall.co.uk>) (no date).
Information downloaded from Arcall website (<www.arcall.co.uk>) (no date).
Information downloaded from Fedco website (<www.fedcosystems.com>) (no date).
Lefebvre, Arthur H., "Atomization & Sprays," Taylor & Francis, Ch. 4, pp. 127–136, (1989).
Lefebvre, Arthur H., "Atomization & Sprays," Taylor & Francis, Ch. 5, pp. 189–193, (1989).
Lefebvre, Arthur H., "Atomization & Sprays," Taylor & Francis, Ch. 1, pp. 1–25, (1989).
Lefebvre, Arthur H., "Atomization & Sprays," Taylor & Francis, Ch. 6, pp. 222–228, (1989).

* cited by examiner

*Primary Examiner*—Lisa A. Douglas
(74) *Attorney, Agent, or Firm*—Mark P. White

(57) ABSTRACT

An atomizer for coating materials is provided. The atomizer includes two opposing discs connected by a central hub. Each disc includes an inwardly extending flange about its perimeter. The central hub has an exterior surface defining a v-shaped surface. When assembled in a coating apparatus, a fluid material, such as batter, may be dispensed toward the exterior surface of the hub while the disc is spinning. The resulting spray of fluid may be used to coat material effectively, while minimizing waste.

15 Claims, 21 Drawing Sheets

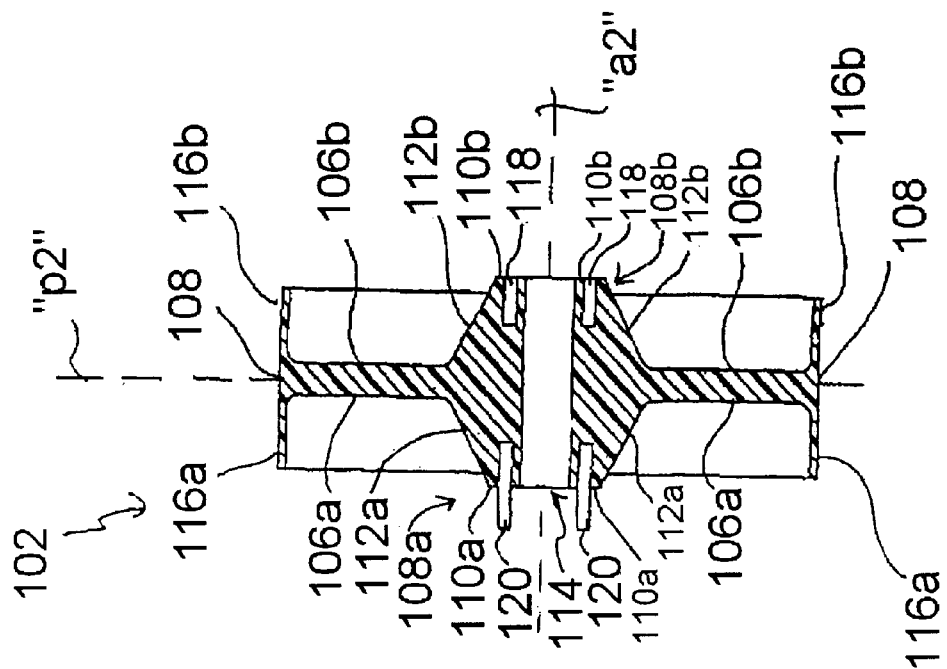
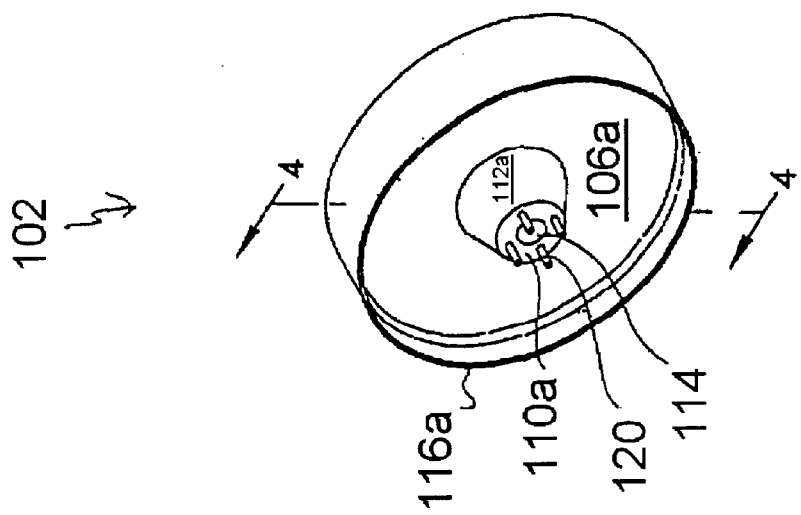
Fig. 8
Fig. 7

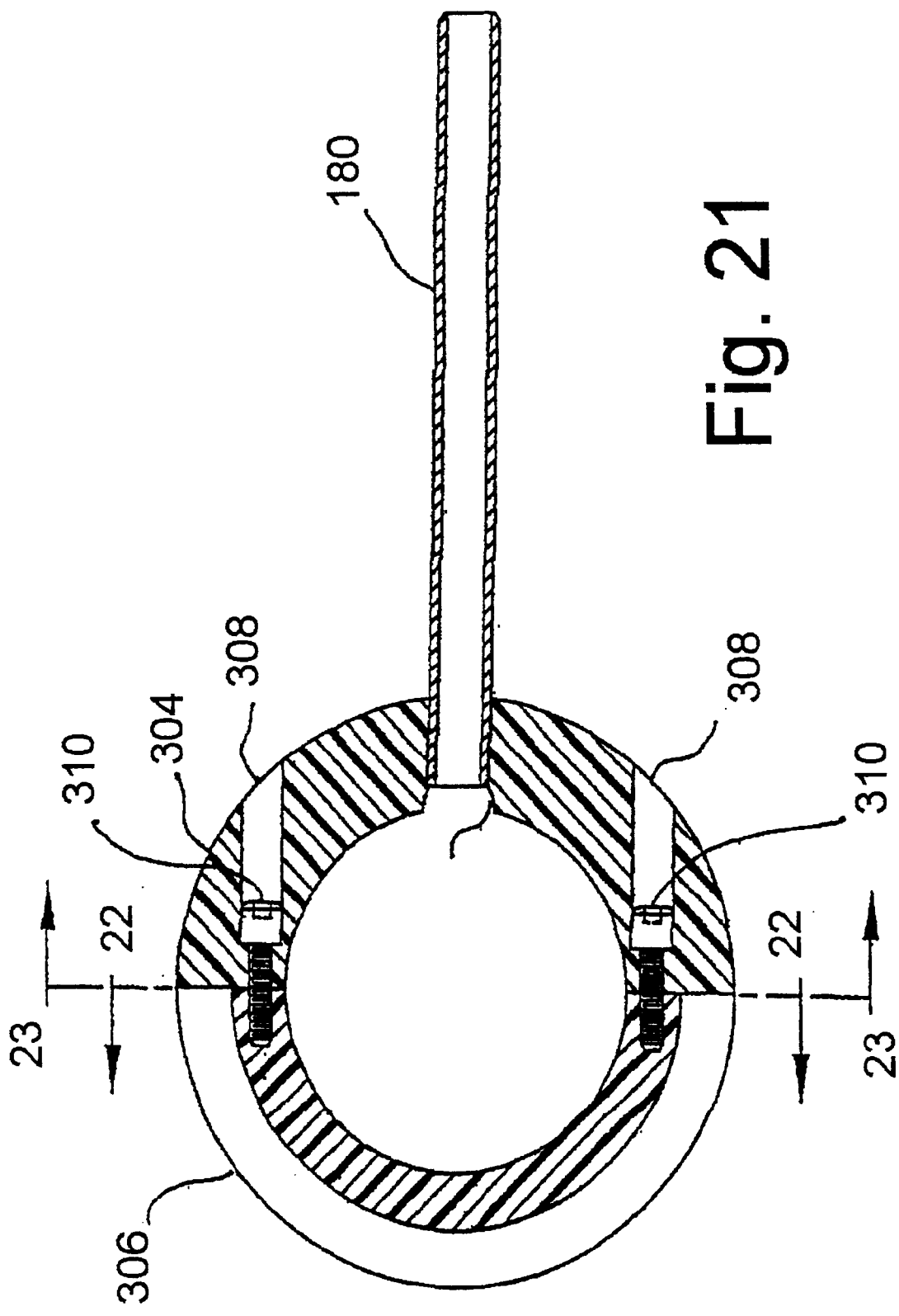

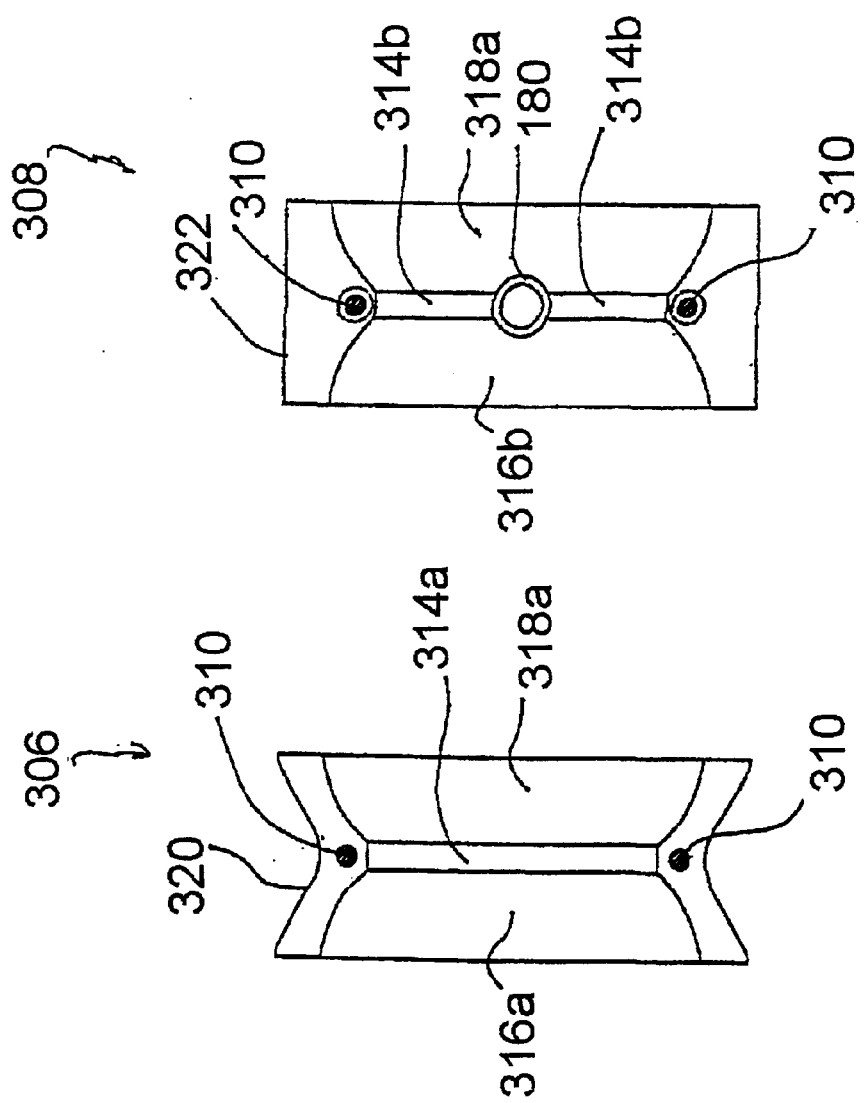

COATING APPARATUS AND METHOD OF USE

RELATED CASES

Priority under 35 U.S.C. §119(e) is hereby claimed to U.S. Provisional Patent Application No. 60/202,893 to Lohkamp, Mark R., filed on May 10, 2000, which is incorporated herein by reference in its entirety.

FIELD OF THE INVENTION

The present invention is related to a method and apparatus for coating and, in particular, to a method and apparatus for coating food products.

BACKGROUND AND RELATED ART

The food industry coats foods in a variety of different ways to apply coatings, such as batters, to food products. Representative patents showing various ways of applying batter to food include U.S. Pat. No. 1,870,099 to Croan; U.S. Pat. No. 2,287,067 to Schmidt; U.S. Pat. No. 3,103,311 to Kempf; U.S. Pat. No. 3,288,052 to Hough; U.S. Pat. No. 3,459,586 to Kiwiet et al.; U.S. Pat. No. 3,606,099 to Benson; U.S. Pat. No. 3,961,755 to Morine et al.; U.S. Pat. No. 4,018,367 to Morine et al.; U.S. Pat. No. 4,043,294 to Morine et al.; U.S. Pat. No. 4,058,083 to Miller; U.S. Pat. No. 4,407,217 to Jackson; U.S. Pat. No. 5,328,509 to Essex; U.S. Pat. No. 5,463,938 to Sarukawa et al.; U.S. Pat. No. 5,478,583 to Jarrett et al.; U.S. Pat. No. 5,575,848 to Chedville; and U.S. Pat. No. 5,865,890 to Makujina.

One method of applying a coating to food involves dipping the pieces of food into a batter. Dipping methods are advantageous because they provide a coating over an entire piece of food. However, the dipping material gradually becomes contaminated by food product residue transferred from the food to the batter as successive pieces of food are dipped. Eventually, the batter must be disposed of, resulting in a relatively large amount of unused batter that is wasted.

Another method of coating food involves spraying a batter through a nozzle directed at the food, which is transported on a conveyor belt underneath the nozzles. Nozzle methods typically provide coating on only one side of the food product. Moreover, the nozzles frequently become clogged with batter, especially if the batter includes particulate material. Thus, the viscosity of batter that may be applied using the nozzle method must be minimized in order alleviate clogging the nozzles. Moreover, the size of any particulate material contained in the batter must also be minimized in order to prevent clogging of the nozzles.

Yet another method of applying coating to food involves the use of rotary atomizers, or spinning discs. Coating food using a rotary atomizer typically involves spraying batter through a nozzle onto the surface of a spinning disc, from which the batter is sprayed onto the food product. Typically, the food product is transported by the conveyor belt, as in the nozzle method.

What is needed in the art is a device and apparatus for encapsulating or evenly coating all surfaces of a food product, with a relatively high viscosity fluid that may include particulate material, while minimizing waste and contamination.

SUMMARY

The advantages provided by the present system and device include a method for encapsulating or providing substantially even coating on all sides of the food product. The device and method provide substantially even coating of articles regardless of their position on a conveyor belt. The method also provides minimal contamination to the batter, thus allowing recycle and re-use of previously dispensed batter from the spraying process. The devices and methods of the present disclosure also allow fluids with a wide range of viscosities to be applied to food products. Additionally, the design of the present rotary atomizing devices allow a wide range of particle sizes to be added to the fluid and dispensed from the device without clogging the fluid distribution nozzles.

In one embodiment, the present disclosure is directed to a rotary atomizing device that includes two spaced apart opposed discs, each having a perimeter and an interior surface. A central hub is disposed between and connects each disc. A bore extends coaxially through the first disc, the central hub, and the second disc. A flange extends substantially perpendicularly from the interior surface of each disc at the perimeter of each disc.

In another embodiment, the present disclosure is directed to a rotary atomizing device that includes a disc having a perimeter and opposing outer surfaces. A frustum extends from each opposing outer surface. Each frustum has an outer surface and a face parallel to the disc. A bore extends coaxially through the disc. A flange extend substantially perpendicularly from each opposing outer surface of the disc at the perimeter of the disc.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when considered in connection with the accompanying illustrative drawings in which:

FIG. 7 is an isometric view of one disc of the device of FIG. 6;

FIG. 8 is a sectional view of the device of FIG. 7;

FIG. 21 is a section of the accessory of FIG. 20;

FIG. 22 shows the accessory of FIG. 20 along line 22—22;

FIG. 23 shows the accessory of FIG. 20 along line 23—23;

DETAILED DESCRIPTION OF THE PREFERRED EMBODIMENTS

The present disclosure is directed to a system and method for applying a fluid material to an article using a fluid distribution or rotary atomizing device, and to an apparatus that includes the device, and to a method of using the device and apparatus. The rotary atomizing device allows fluids of varying viscosities to be applied to a surface. Regardless of the viscosity of the fluid, the rotary atomizing device is also useful for applying fluids that may include relatively large amounts of particulate material. The device has particular utility for applying batter to foods, especially relatively viscous batter, up to at least about 50 percent solids content.

In a preferred embodiment, the device and method may be used to dispense a batter onto food products to coat the food products. The device and method allow an unexpectedly wide range of batter viscosities to be applied to the food products, as well as batters that include relatively large particles, without clogging the apparatus and minimizing contamination of the batter.

Figure 1:
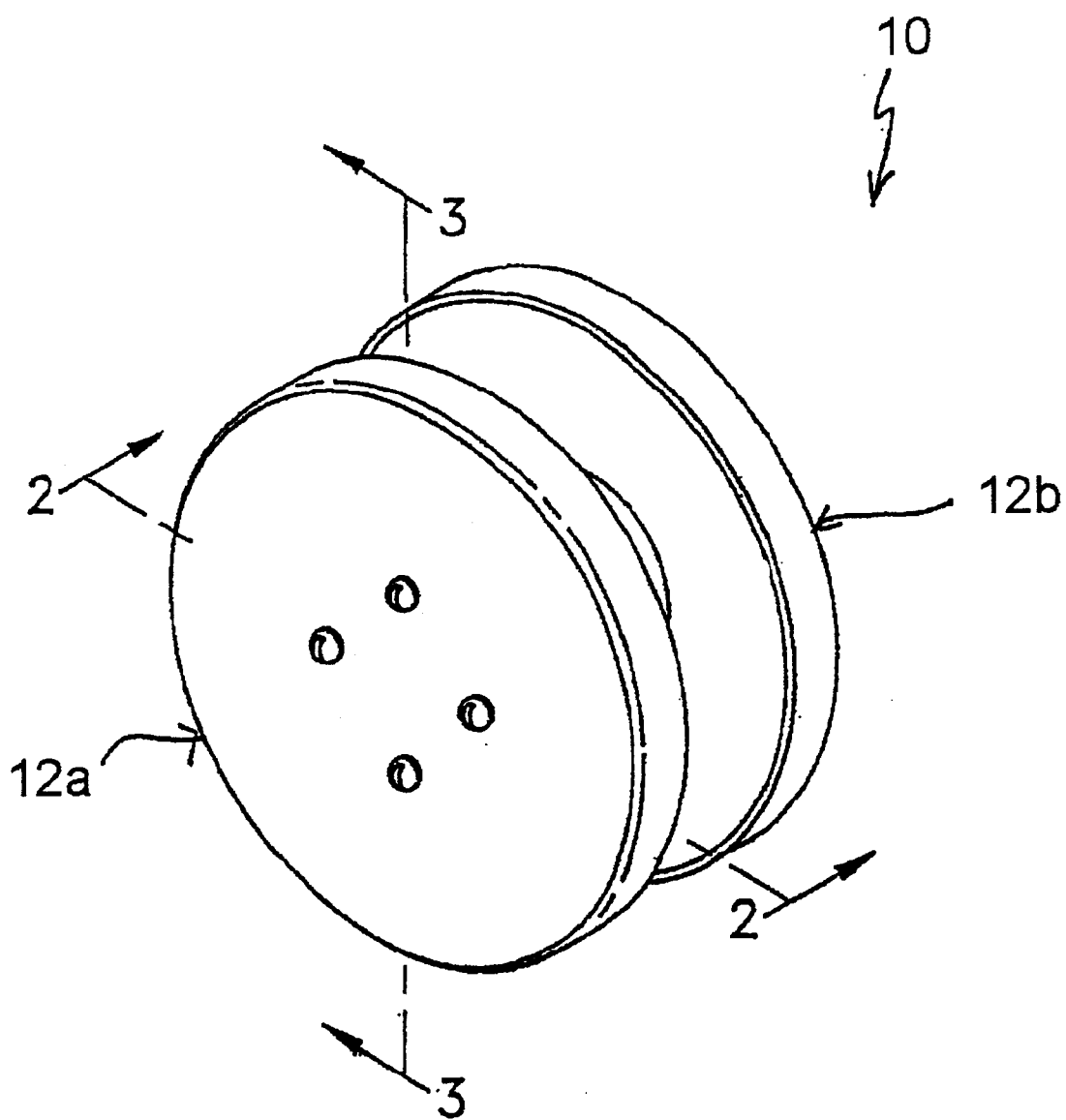
FIG. 1 is an isometric view of one embodiment of a rotary atomizing device according to the present disclosure.
Figure 2:
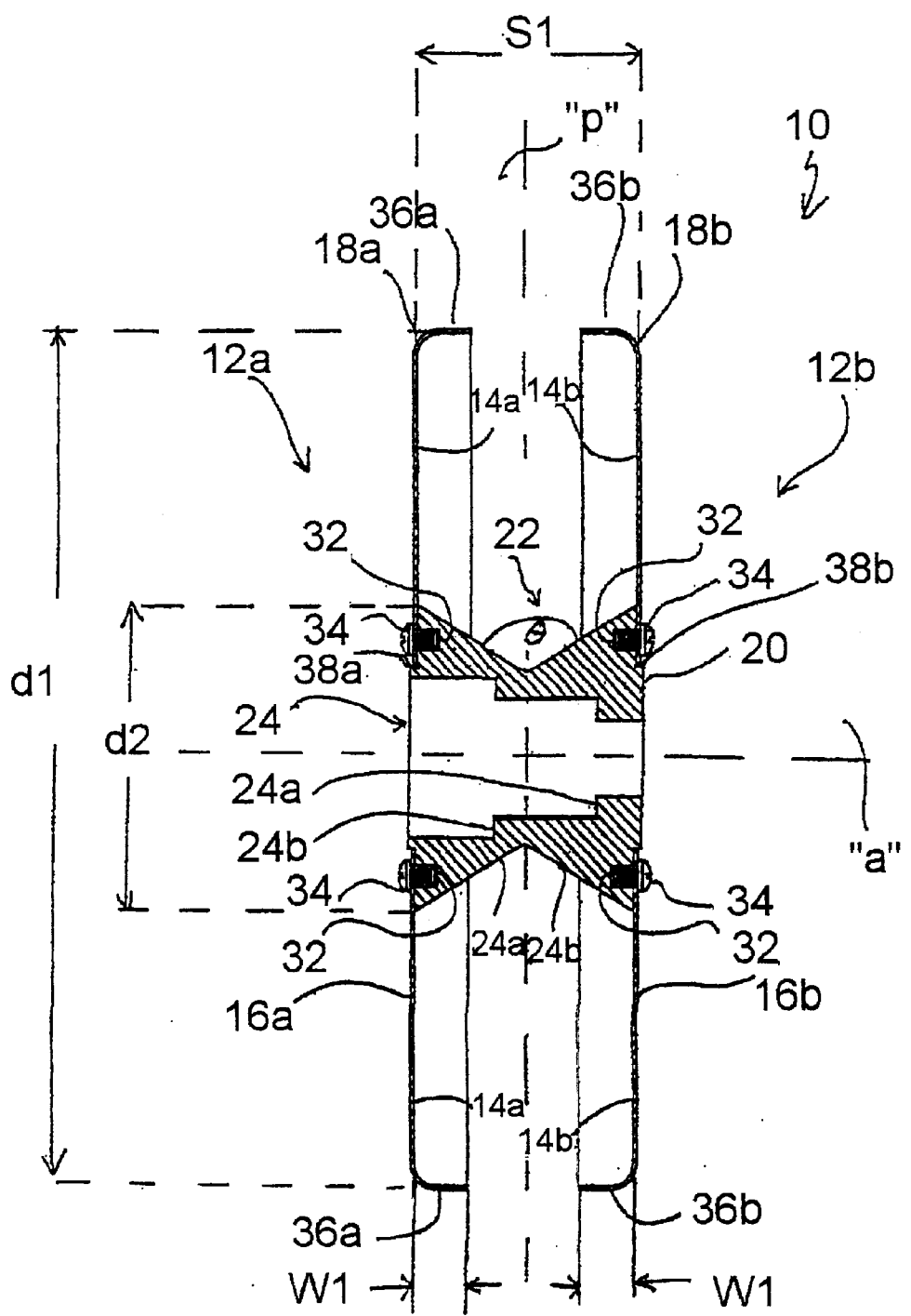
FIG. 2 is a sectional view of the device of FIG. 1.
Figure 3:
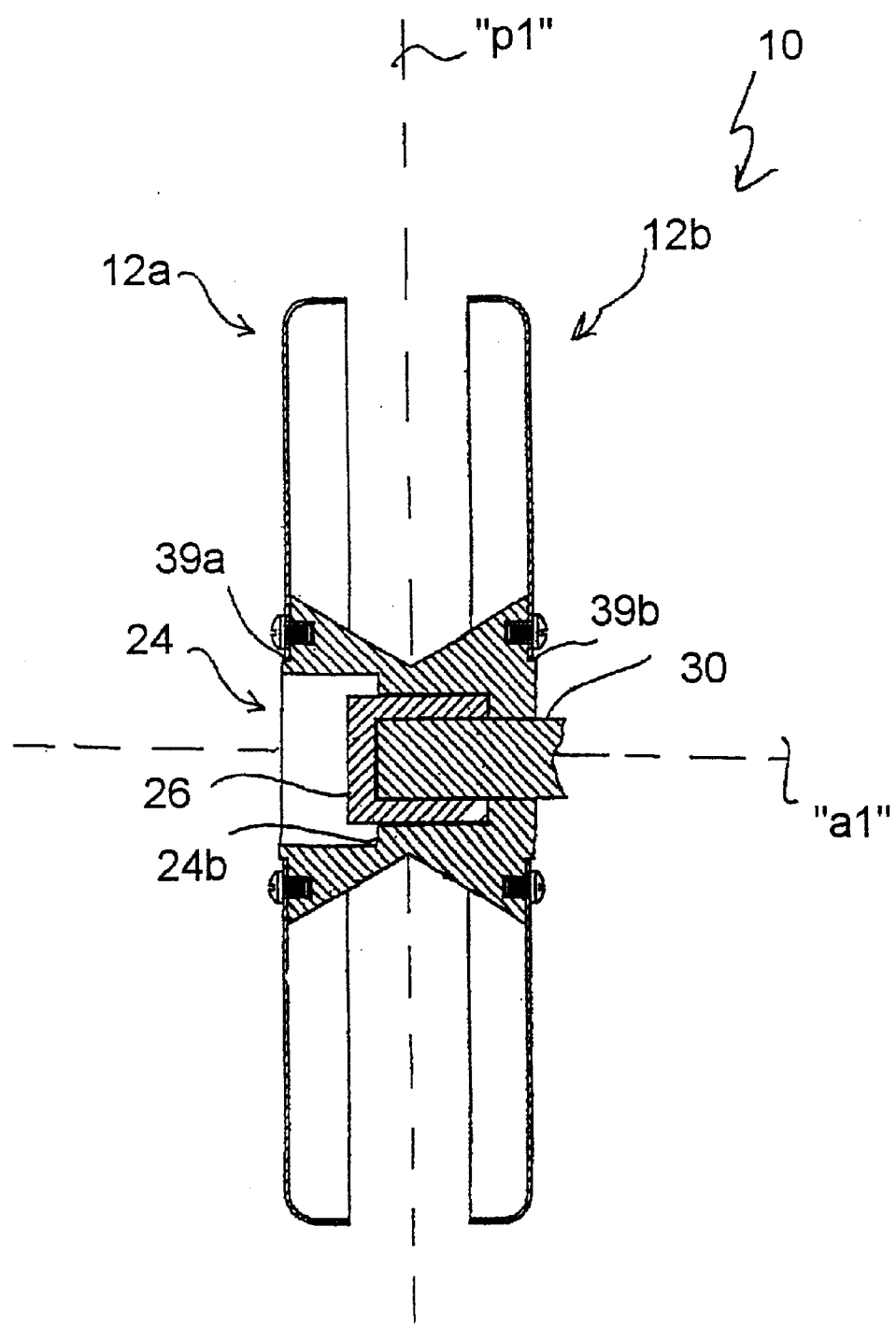
FIG. 3 is a sectional view of the device of FIG. 1 showing engagement with a bushing and drive shaft.

One embodiment of a rotary atomizing device 10 according to the present disclosure is illustrated with reference to FIGS. 1–5. FIG. 1 illustrates device 10 in a perspective view including two spaced apart opposed discs 12a,b. As shown in FIGS. 2 and 3, spaced apart opposed discs 12a,b are substantially symmetrical about plane "$P_1$," and each includes an inner surface 14a,b, an outer surface 16a,b, and a perimeter 18a,b. In the present embodiment, the spacing $S_1$ between discs 12a,b is preferably about 2 inches, and each disc 12a,b preferably has a diameter $D_1$ of about 7 inches.

A centrally disposed hub 20 having an outer surface 22 connects inner surfaces 14a,b of discs 12a,b. An axial bore 24 extends through hub 20 in coaxial alignment with axis "a," which is substantially perpendicular to plane $P_1$. Preferably, bore 24 includes steps 24a and 24b, for engagement with bushing 26 and drive shaft 30, as shown in FIG. 3, the purpose of which will be explained in greater detail below. Bushing 26 is preferably a quick-mount keyless bushing or transtorque bushing. A plurality of apertures 32 preferably may be disposed radially about bore 24 of central hub 20 to allow engagement of central hub 20 to each disc 12a,b by fasteners 34, which are illustrated herein as screws.

Figure 5:
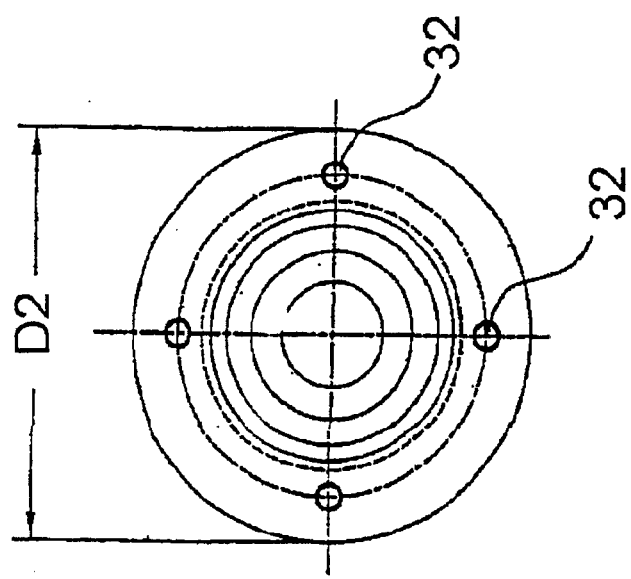
FIG. 5 is a top view of the device of FIG. 1.
Figure 4:
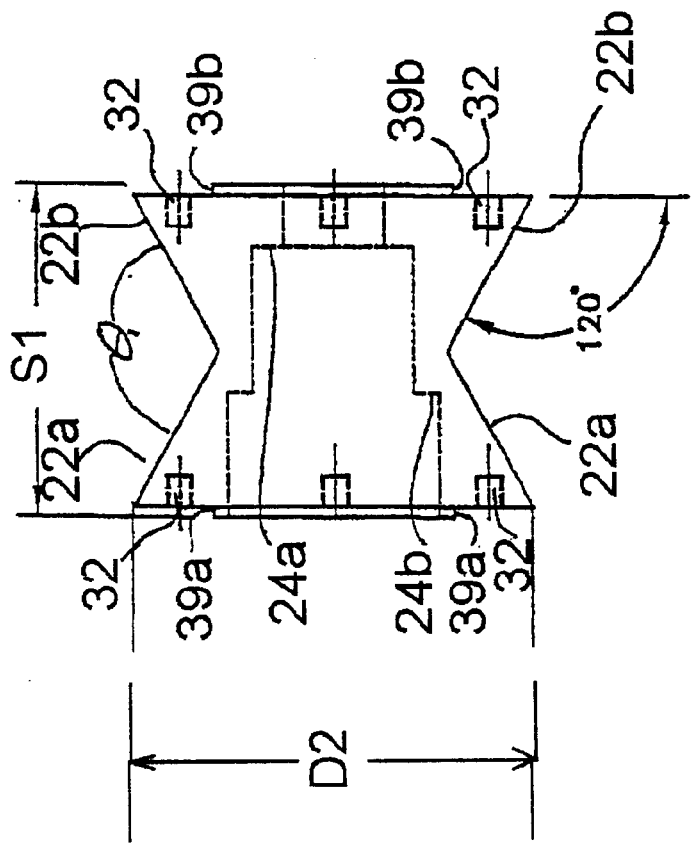
FIG. 4 is a side view of the central hub the device of FIG. 1.
Figure 6:
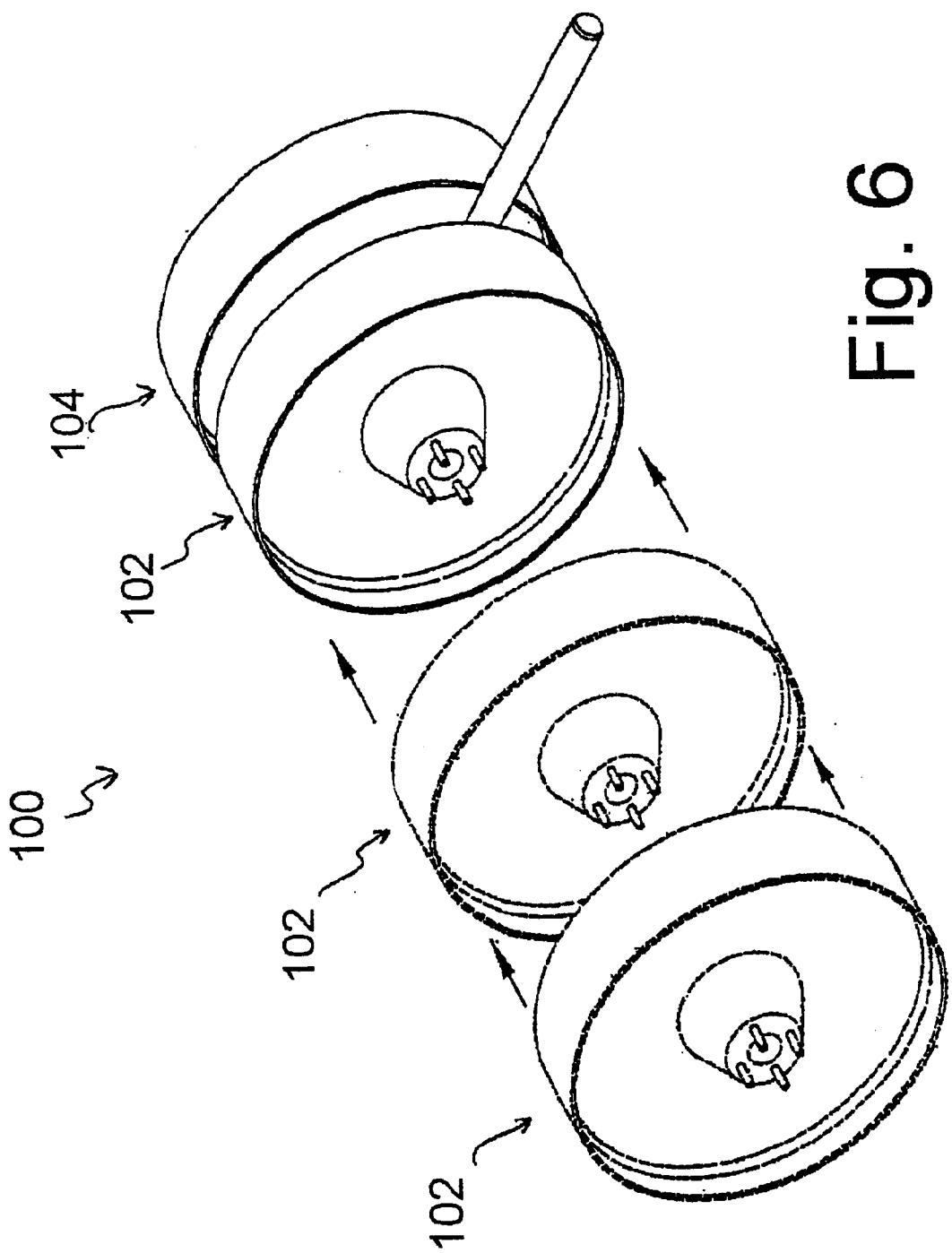
FIG. 6 is an isometric view of another embodiment of a rotary atomizing device according to the present disclosure.

As shown in FIGS. 2–4 taken together, outer surface 22 of central hub 20 includes two surfaces 22a,b that intersect at plane $P_1$. Outer surfaces 22a,b are substantially symmetrical with respect to plane $P_1$, and extend from plane $P_1$ toward perimeter 18a,b, respectively, to define an angle $\theta_1$, which is preferably less than about 90 degrees, more preferably in the range of about 30 degrees to about 60 degrees. Thus, outer surfaces 22a,b provide central hub 22 with a substantially vee-shaped, or hourglass-shaped outer surface 22. The angle $\theta_1$ of outer surface 22 of hub 20 may be important for maximizing the amount of fluid that may be distributed from device 10, as will be explained in greater detail below. As shown in FIG. 5, in the present embodiment, central hub 22 preferably has a diameter $D_2$ of about 2.5 inches.

Referring back to FIGS. 2 and 3, flanges 36a,b extend substantially perpendicularly from each inner surface 14a,b along perimeter 18a,b. Flanges 36a,b may have a width $W_1$ ranging from about ¼ inch to about 2 inch, more preferably about ½ inch to about 1½ inch. In the present embodiment, width $W_1$ is about ½ inch. For ease of machining, the intersection of inner surface of each disc 12a,b with flanges 36a,b preferably has a radius of about ¼ inch. It is thought that the radius enhances the movement of fluid towards the end of the flange, where it becomes atomized. However, a perpendicular intersection of inner surface of each disc 12a,b with flanges 36a,b is also possible.

In some embodiments, inner surface 14a,b of each disc 12a,b may include a recess 38a,b into which shoulder 39a,b of central hub 20 may be received. Preferably, recess 38a,b may have a diameter sufficient to allow friction fitment of central hub 20 therein.

Discs 12a,b and central hub 22 may be unitary or integral, depending on the material of construction and the method of constructing the discs. Preferably, when used in the food industry, device 10 is machined or molded from a food-grade material including plastics such as Delrin or ultra-high molecular weight polyethylene (UMHW-PE) and metal such as 304/316 grade stainless steel. Those of skill in the art will recognize that the dimensions of device 10 may vary as needed depending on the particular application in which it is used. All surfaces of device 10, in the present embodiment, are substantially smooth and flat. Those of skill in the art will also recognize that it is possible for any or all of the surfaces of device 10 to include patterns or grooves machined therein, as is known in the art of rotary atomizing, if it will improve the performance of the devices.

Another embodiment of a rotary atomizing device 100 according to the present disclosure will now be described with reference to FIGS. 6–10. Device 100 includes a plurality of sequentially arranged discs 102. In preferred embodiment, capping discs 104 may be positioned at opposing ends of the sequence of discs 102. The structure of discs 102 allow them to be coupled together in sequential arrangement, which increases the amount of fluid that may be applied to a surface or allows the application of fluid to a larger surface area than may be possible with device 10.

A single disc 102 will be described now with reference to FIGS. 7–8. As shown, disc 102 is substantially symmetrical in construction about plane "$P_2$.". Each disc 102 includes opposing side surfaces 106a,b having a perimeter 108. A centrally disposed frustum 108a,b may be disposed on each side surface 106a,b. Frustums 108a,b each have a top surface 110a,b and an outer surface 112a,b. An axial bore 114 extends through frustums 108a,b in coaxial alignment with axis "$a_2$," which is substantially perpendicular to plane $P_2$. Flanges 116a,b extend substantially perpendicularly from each side surface 106a,b along perimeter 108. Preferably, a plurality of apertures 118 are formed in top surfaces 110a,b of each frustum 108a,b for receiving pins 120, as explained in greater detail below.

Figure 10:
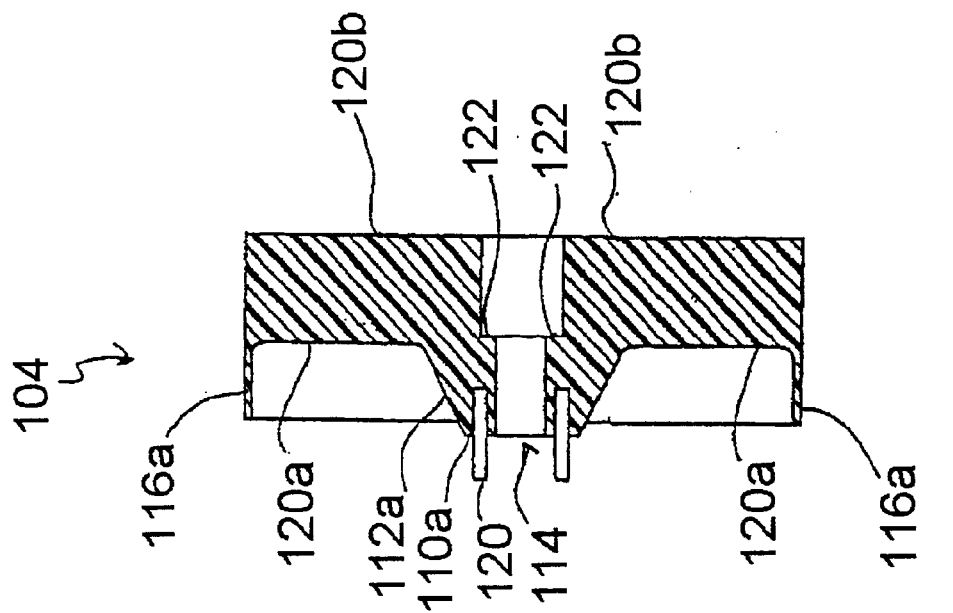
FIG. 10 is a sectional view of the capping disc of FIG. 9.
Figure 9:
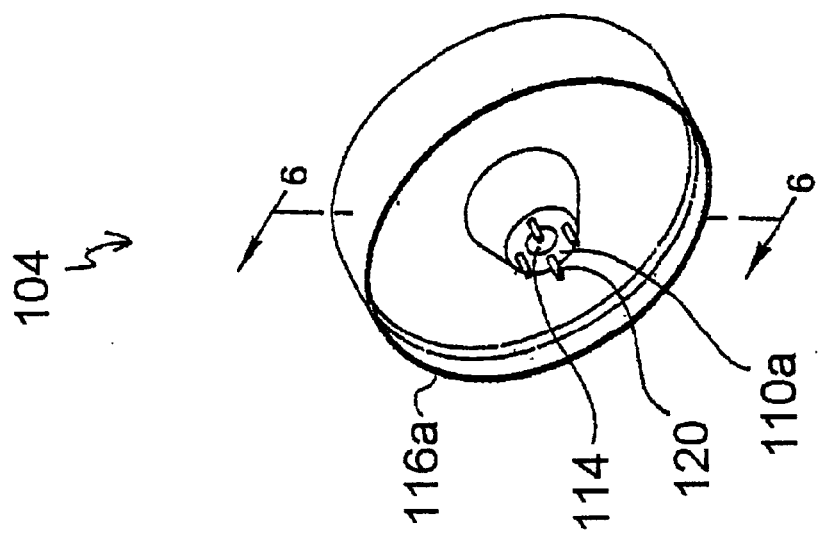
FIG. 9 is an isometric view of a capping disc of the device of FIG. 6.
Figure 11:
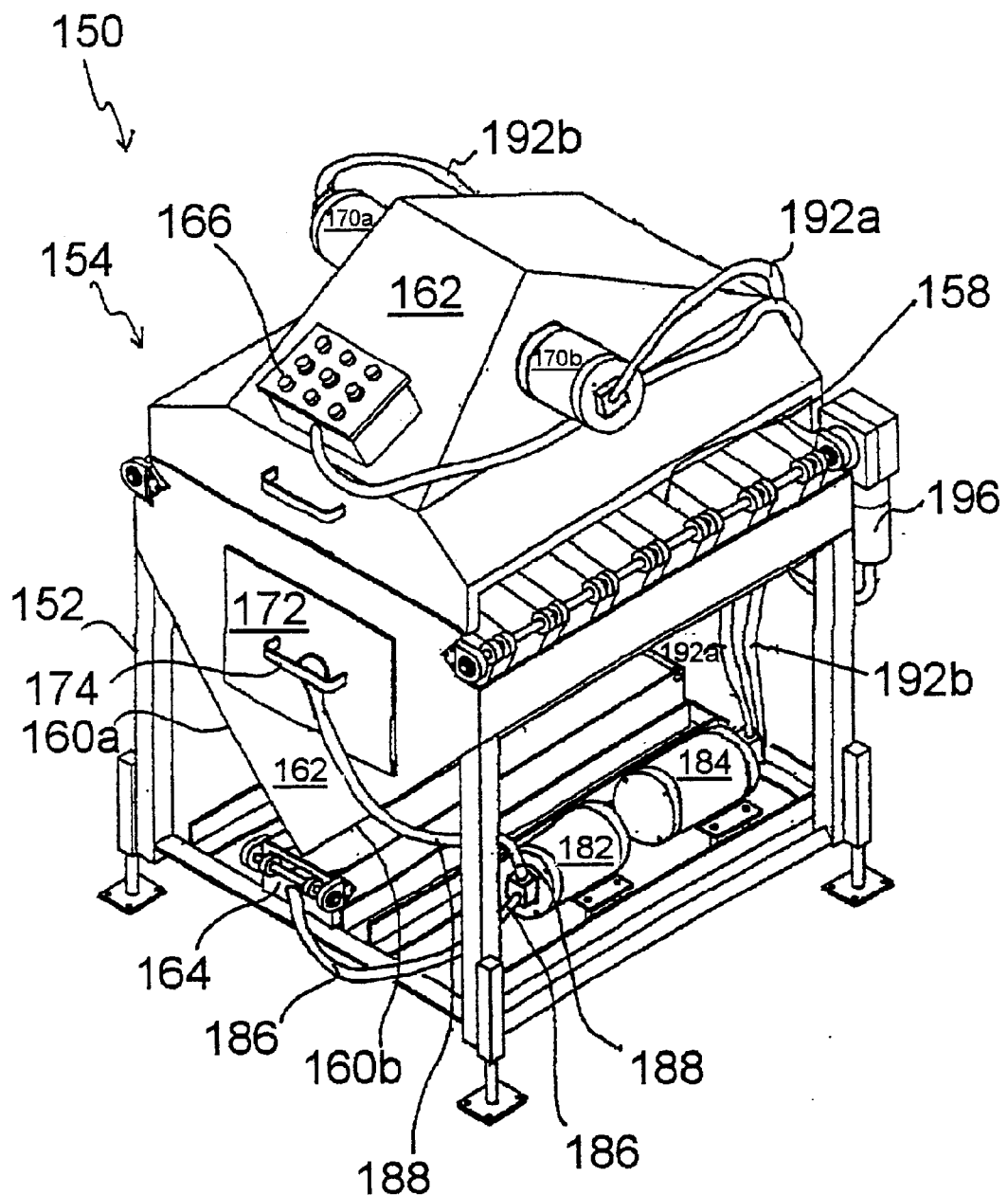
FIG. 11 is an isometric view of one embodiment of an apparatus for applying fluid to a surface, with the cover in a closed position.
Figure 12:
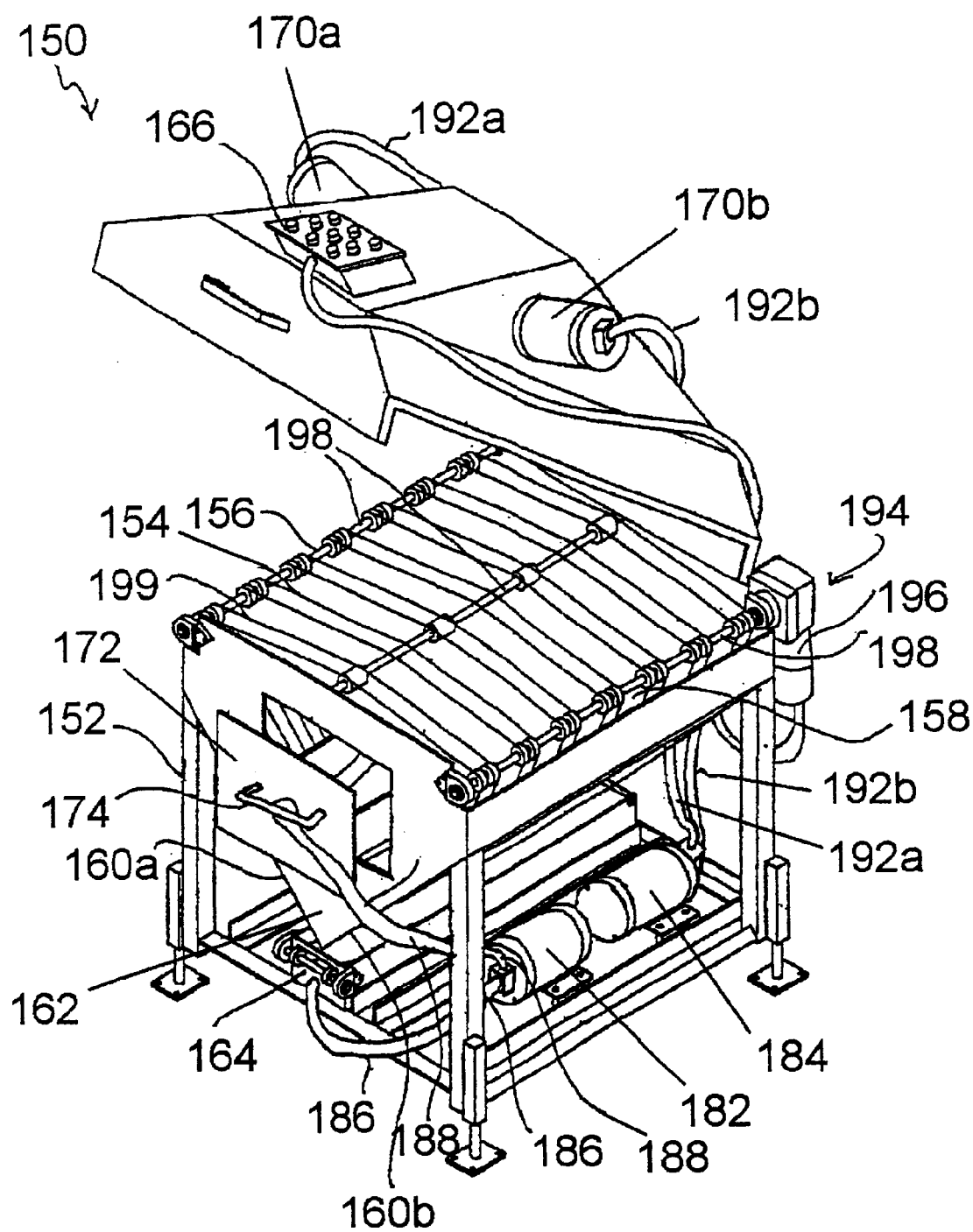
FIG. 12 is an isometric view of the apparatus if FIG. 11 with the cover in an open position.
Figure 13:
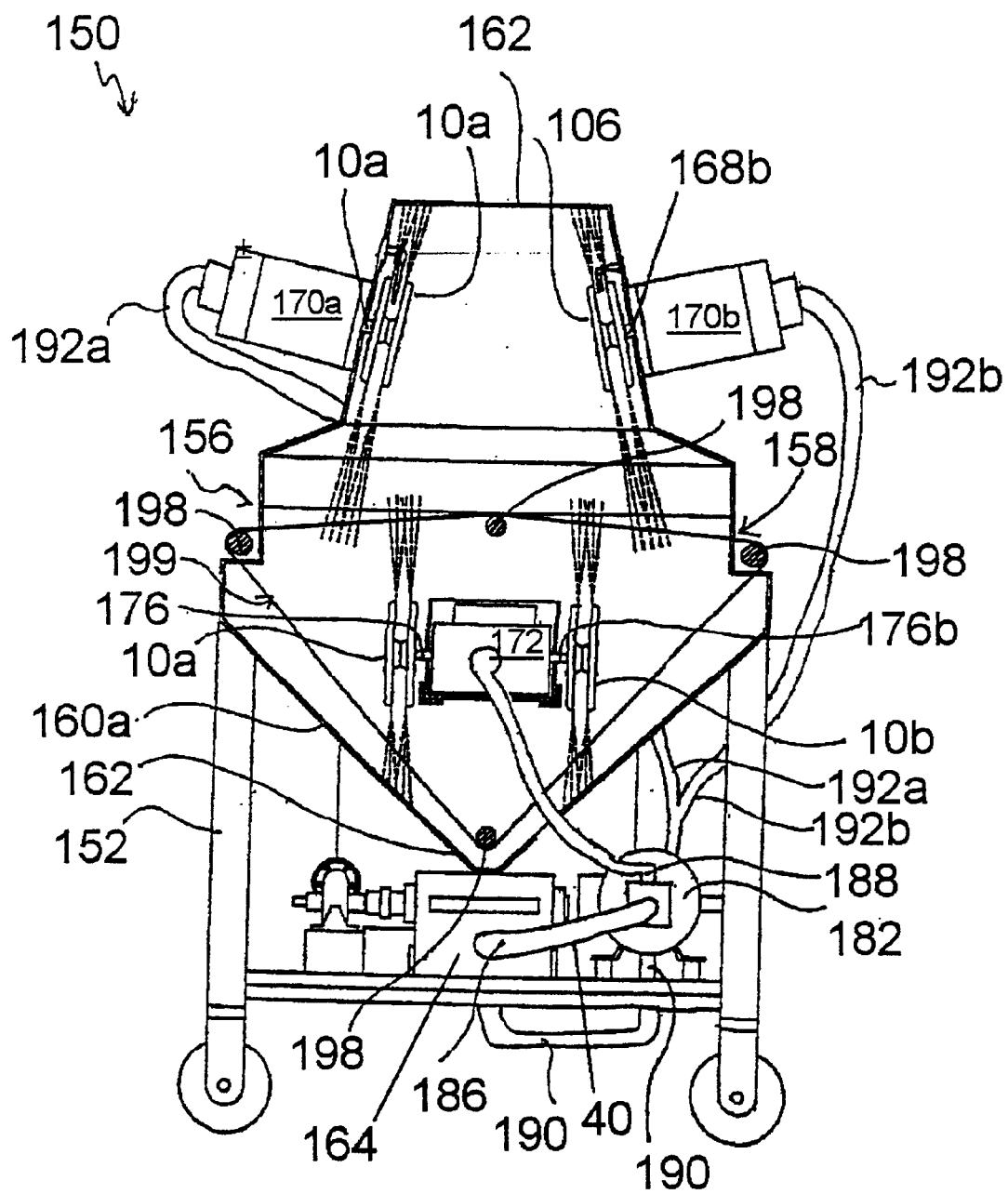
FIG. 13 is a sectional view of the apparatus of FIG. 11.
Figure 14:
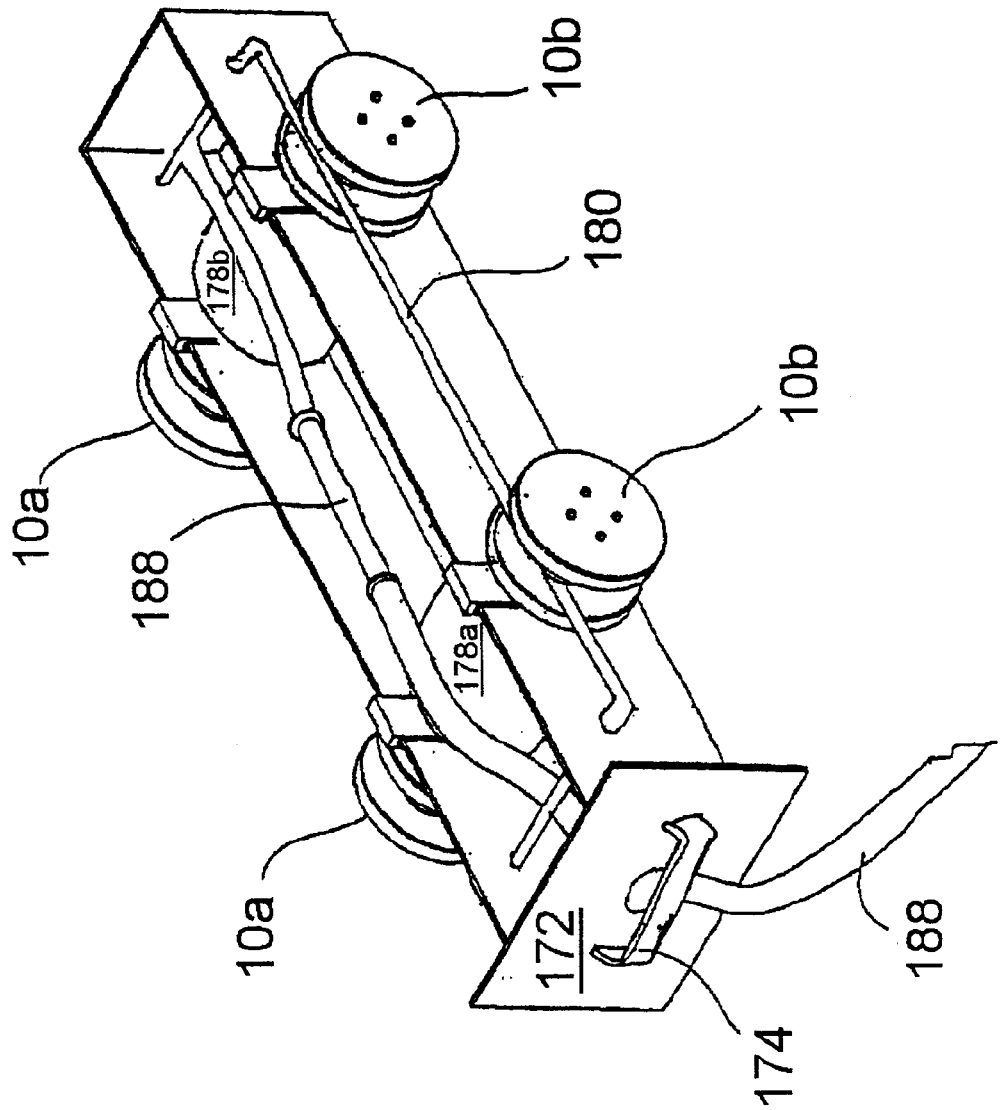
FIG. 14 is an isometric view of the drawer of the apparatus of FIG. 11.
Figure 15:
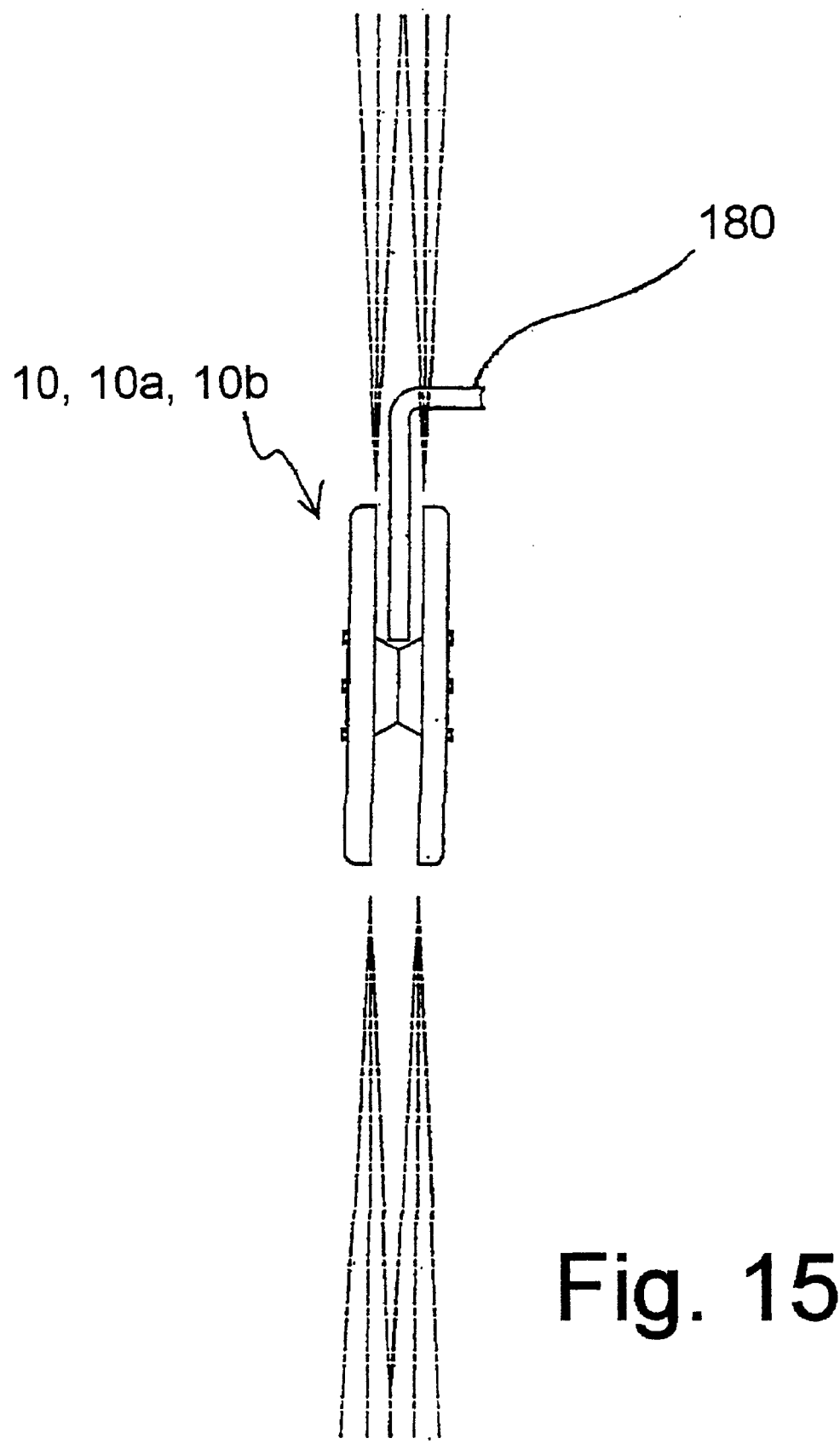
FIG. 15 is a side view of the device of FIG. 1 showing relative engagement with a fluid distribution tube.
Figure 16:
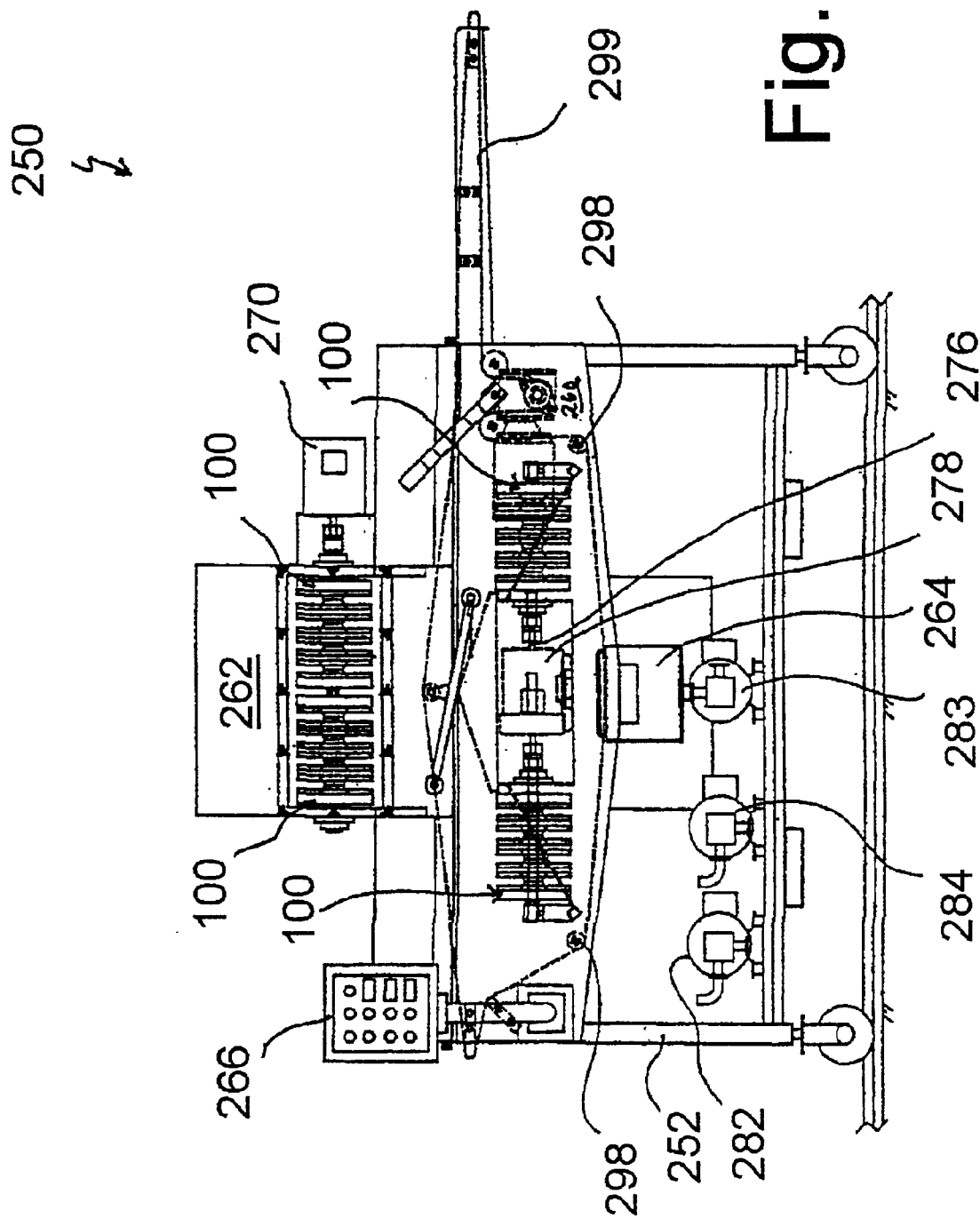
FIG. 16 is a front view of another embodiment of an apparatus for applying fluid to a surface.
Figure 17:
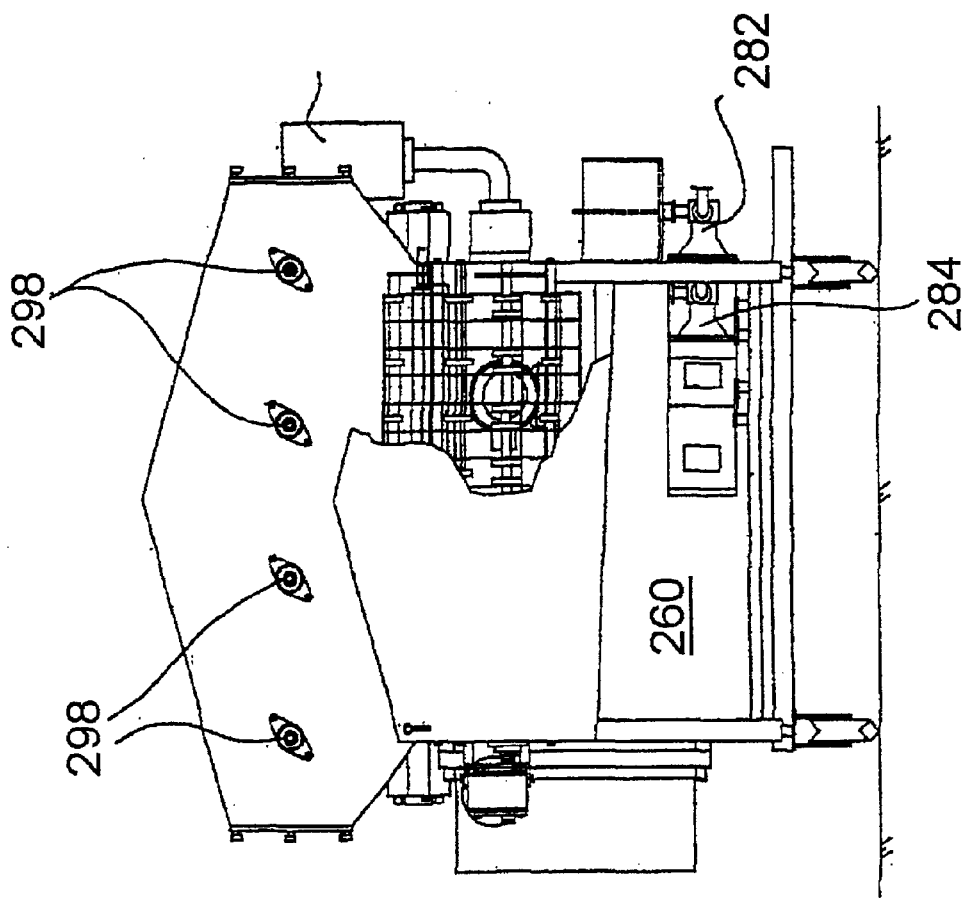
FIG. 17 is a back view of the apparatus of FIG. 16.
Figure 18:
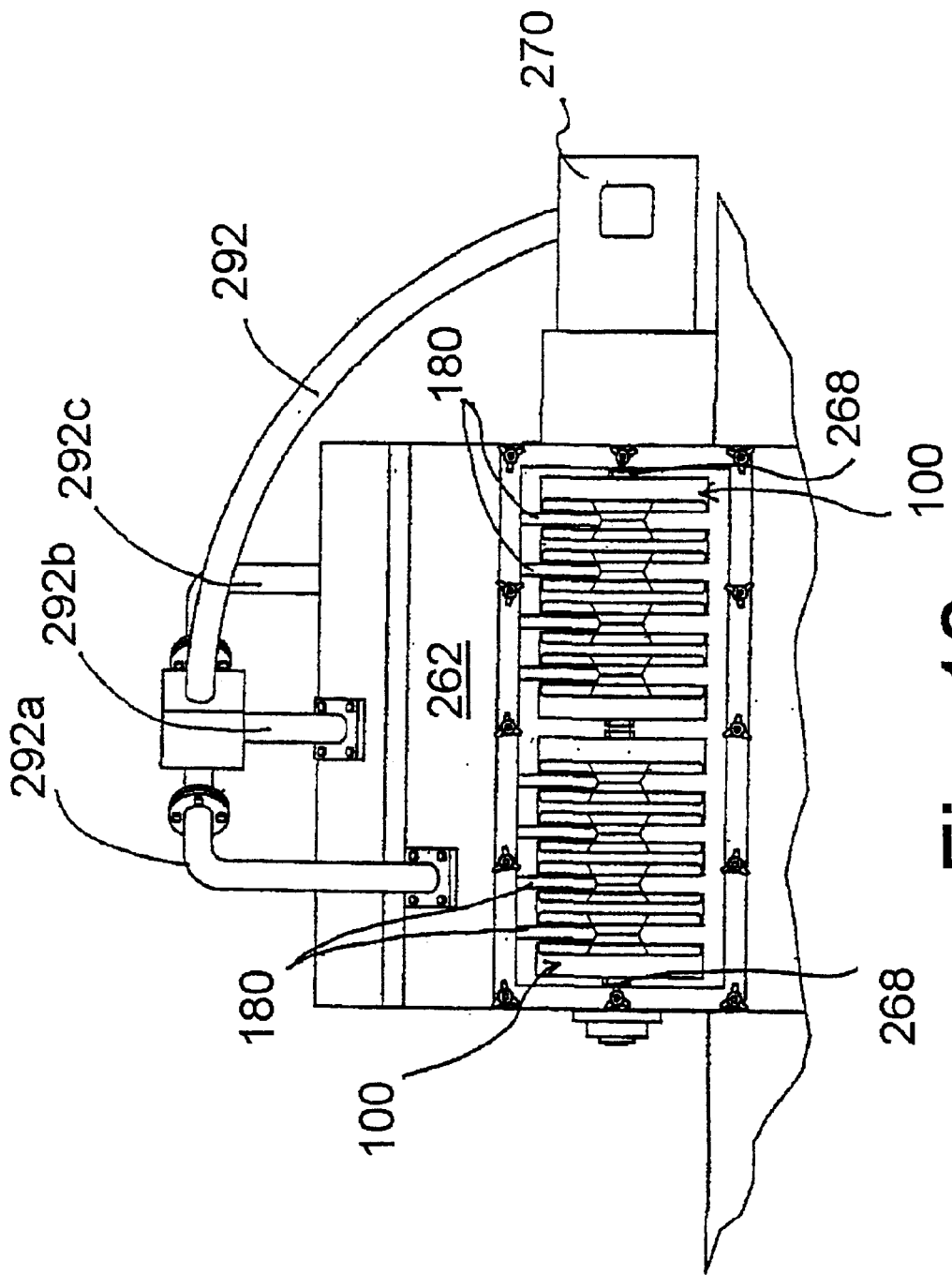
FIG. 18 is an isometric view of the cover portion of the apparatus of FIG. 16.
Figure 19:
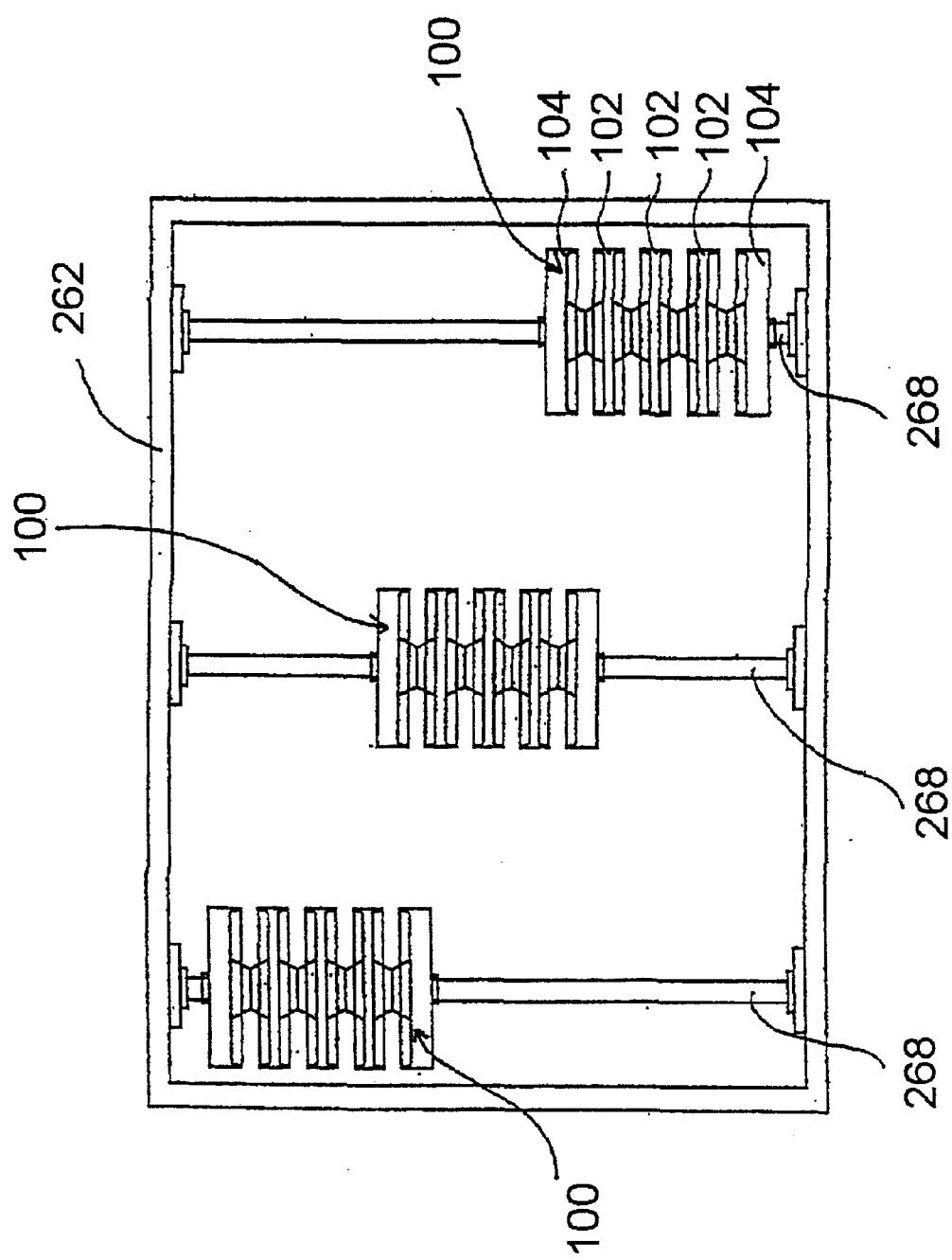
FIG. 19 is a top isometric view of the cover portion of the apparatus of FIG. 16.

A single capping disc 104 will now be illustrated with reference to FIGS. 9–10. As shown, disc 104 includes a perimeter 108 and two opposing sides 120*a,b*. Side 120*a* is substantially similar in construction to side surface 106*a* of disc 102, whereas side 120*b* is substantially planar. Thus, side 120*a* includes centrally disposed frustum 108*a* having atop surface 110*a* and an outer surface 112*a*. An axial bore 114 extends through frustum 108*a* in coaxial alignment with axis "$a_3$," which is substantially perpendicular to plane $P_3$. Bore 114 includes a step 122 for receiving a transtorque bushing. Flange 116*a* extends substantially perpendicularly from side surface 120*a* along perimeter 108. Preferably, a plurality of apertures 118 are formed in top surface 110*a* of frustum 108*a* for receiving pins 120.

As in the previous embodiment, the dimensions of discs 102 and capping discs 104 may vary depending on the particular application in which they are used. In the present embodiment, each disc 102 and 104 has an outer diameter $D_1$ of about 7 inches. The diameter $D_2$ of the central hub is preferably about 2.5 inches, and the spacing $S_1$ between each sequential disc 102 and between disc 102 and capping disc 104 and is preferably about 2 inches.

As in the previous embodiment, discs 102 and 104 may have a unitary or integral construction, depending on the material of construction and the method of constructing the discs. Preferably, when used in the food industry, device 100 is machined or molded from a food-grade material including plastics such as Delrin or ultra-high molecular weight polyethylene (UMHW-PE) and metal such as 304/316 grade stainless steel. Those of skill in the art will recognize that the dimensions of device 100 may vary as needed depending on the particular application in which it is used.

All surfaces of device 100, in the present embodiment, are substantially smooth and flat. Those of skill in the art will also recognize that it is possible for any or all of the surfaces of device 10 to include patterns or grooves machined therein, as is known in the art of rotary atomizing, if it will improve the performance of the devices.

FIGS. 11–14 illustrate another aspect of the present disclosure, which is an apparatus 150 for coating articles with a fluid material, preferably for coating articles of food with batter. An exemplary apparatus 150 is shown in perspective view in FIGS. 11 and 12. As shown, apparatus 150 includes a frame 152 supporting a chamber 154 having an inlet end 156 and an outlet end 158. Chamber 154 includes a base 160 connected to a cover 162. Base 160 preferably has downwardly sloping sides 160*a,b* that intersect at the lower end 162 of base 160 above a fluid reservoir 164. Cover 162 may be hingedly connected to base 160 in preferred embodiments. A control panel 166 may be suitably disposed on cover 162 to enable an operator to operate various controls. Power to apparatus 150 may be supplied by any suitable means.

A plurality of the previously described rotary atomizing devices 10 are disposed within cover 162 and base 160. Although illustrated herein with several rotary atomizing devices, those of skill in the art will recognize that only one may be necessary, depending on the particular application. Similarly, any number of devices 10 may be included in an apparatus, if needed or desired. As shown best in FIG. 13, two devices 10*a,b* are disposed in cover 162. Each device 10*a,b* is supported on drive shafts 168*a,b* that extend through cover 162 to connect to motor 170*a,b* which drives shafts 168*a,b*.

Base 160 includes a support member 172 for supporting several of the foregoing rotary atomizing devices. As best shown in FIGS. 13 and 14 when taken together, support member 172 has a drawer-like construction which allows it to be slidably removed from base 160 using, for example, handle 174. Two devices 10*a* and two devices 10*b* are disposed on opposites of drawer 172. Each of the four devices 10*a,b* are supported on drive shafts 176*a,b* extending through the wall of drawer 172 to connect to motors 178*a,b,* which rotatably drive shafts 176*a,b*. A fluid dispensing tube 180 (not illustrated in each drawing) may be disposed within each device 10*a,b* proximate the outer surface of the central hub. Dispensing tube 180 may have a diameter ranging from about ⅛ inch to about 1 inch, more preferably about ¼ inch to about ¾ inch. In the present embodiment, the diameter of dispensing tube 180 is about ½ inch. One exemplary arrangement of a fluid dispensing tube 180 between discs 12*a,b* is illustrated in FIG. 15.

Fluid dispensing tube 180 may distribute a fluid drawn from fluid reservoir 164 containing a source of fluid to be dispensed by a variety of suitably connected fluid dispensing lines. As illustrated in FIGS. 11–13, two motor driven pumps 182, 184 are supported on frame 152. Pump 182 draws fluid from reservoir 164 through line 186 and dispenses the fluid through lines 188 which extends through the face of drawer 172 to fluidly connect to devices 10*a,b,* as shown best in FIG. 14. Similarly, pump 184 draws fluid from reservoir 164 through line 190 (see FIG. 13) and dispenses the fluid through lines 192*a,b* which are fluidly connected to devices 10*a,b* within cover 162. The foregoing dispensing lines may have a diameter ranging from about ½ inch to about 2 inch, more preferably about ¾ inch to about 1½ inch. In the present embodiment, the diameter of the dispensing lines is about ½ inch.

A conveyancing assembly indicated generally at 194 includes a motor 196 for rotatably driving a plurality of rollers 198 disposed at various locations within base 160 and about which a conveyor member 199, which is illustrated herein as a belt. Belt 199 is operably disposed for transverse movement within base 160 from inlet end 156 to outlet end 158. Such conveyancing assemblies are well known in the art and will not be described in detail herein. Preferably, rollers 198 are disposed such that conveyor member 199 substantially conforms to the sides 160*a,b* of base 160.

Preferably, when used in the food industry, the components of apparatus 150 that come into contact with food may be constructed from a food-grade material including plastics such as Delrin or ultra-high molecular weight polyethylene (UMHW-PE) and metal such as 304/316 grade stainless steel. Those of skill in the art will recognize that the dimensions of apparatus 150 may vary as needed depending on the particular application in which it is used.

In operation, power to the system is provided, and articles to be coated, preferably food articles, are placed on the conveyor belt. The rotary atomizing devices 10*a,b* may be set to rotate at a rate of about 1500 RPM to about 2000 RPM, with about 1725 RPM being optimal. Generally, at slower rates of rotation, large droplets are dispensed from the discs instead of a fine mist of batter. Moreover, the direction in which the batter is dispensed is narrower, resulting in build-up of thicker, more uneven coating on the food product. Also generally, at high rates of rotation, the dwell time of the batter in the device is insufficient to allow it to acquire sufficient momentum to be atomized and thereby dispensed as a fine mist.

Batter may then be drawn from the reservoir and distributed to each rotating rotary atomizing device in both the cover and the base, while the conveyor belt begins moving.

Typical line speeds in the food industry range from about 50 RPM to about 100 FPM. The present methods provide expanded lines speed capability ranging from about 5 FPM up to about 200 FPM or more, in some instances. The increased line speeds that are possible with the present method are due in part to the increased capacity of the present rotary atomizing devices and systems, as well as the increased dwell time of the batter in the rotary atomizing devices. Those of skill in the art will recognize that modifications may be required to operate at such line speed. For example, it may be necessary to use a different conveyor belts, or to change the rotation rate of the atomizers, to changing the number and position of the rotary atomizing devices, to change the spacing between the rotary atomizing devices and the conveyor belt. Such modifications will be apparent to those of ordinary skill in the art and may be achieved using routine experimentation.

Batter from the food distribution tubes in both the cover and the base is sprayed onto the central hub of each rotary atomizing device. When the batter comes into contact with the outer surface of the central hub, the batter is deflected such that it impacts the flanges of discs. The flanges increase the dwell time of the batter in the disc, allowing the batter to gain the momentum necessary to be atomized as the batter leaves the disc. Thus, the inclusion of the flange in the disc design allows more viscous batters to be dispensed. The increased momentum provide the necessary energy for the batter to be atomized into a fine mist, resulting in a uniform coating on the articles to be coated. The flanges prevent batter from being dispensed too rapidly from the disc which would result in, for example, large droplets of batter, drips of batter, and non-uniform coating generally. Typically, fluids having a viscosity of up to about 12–14 seconds in a #3 Stein Cup (available from Stein/DSI, which is a subsidiary of FMC Food TECH, located in Sandusky Ohio), and/or a solids content of about 50 percent may be dispensed using the present devices and methods.

Thus, using the present method, articles of food may be coated substantially uniformly on all sides, with a relatively viscous fluid or batter, at a relatively high rate that is compatible with most food production lines. The design of the rotary atomizing device allows relatively viscous fluids, or batters to be atomized. The design of the rotary atomizing device also accommodates a relatively high volume of fluid or batter without dripping onto the food.

FIGS. 16–19 illustrate another exemplary embodiment of a coating apparatus. As seen in the figures, apparatus 250 differs from apparatus 150 in size and shape, but otherwise includes substantially the same components, with the exception of the inclusion of rotary atomizing devices 100 rather than devices 10. Where possible, reference numerals indicating the same or similar components as in the previous embodiment have been changed by replacing the number "1" with the number "2." Thus, 152 becomes 252, and so on.

Utilization of rotary atomizing devices 100 in apparatus 250 provides increased fluid distribution capacity, allowing the coating of relatively large amounts of articles or alternatively, coating at faster speed. As shown in FIGS. 16–20 when taken together, cover 262 of apparatus 250 includes a plurality of devices 100 mounted for rotation on drive shafts 268 which are rotatably driven by motor 270. Devices 100 may be spaced apart from one another within cover 262 (best seen in FIG. 18), and staggered with respect to one another within cover 262 so as not to interfere with the fluid distributed by adjacent devices 100 (best seen in FIG. 19). Similarly, base 260 of apparatus 250 also includes a plurality of sequentially arranged rotary atomizing devices 100 which are mounted for rotation on drive shaft 276 driven by motor 278.

As in the previous apparatus, the components of apparatus 250 that come into contact with food may be constructed from a food-grade material including plastics such as Delrin or ultra-high molecular weight polyethylene (UMHW-PE), and metal such as 304/316 grade stainless steel. Those of skill in the art will recognize that the dimensions of apparatus 250 may vary as needed depending on the particular application in which it is used.

Figure 20:
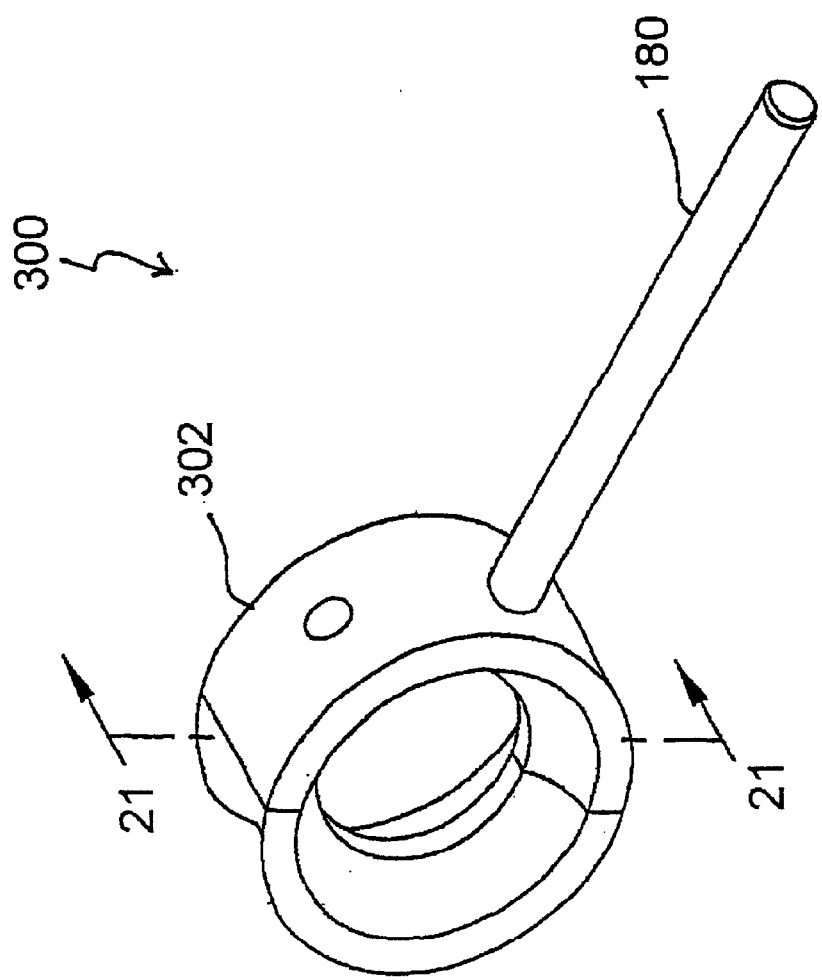
FIG. 20 is an isometric view of an accessory for use with the rotary atomizing devices of the present disclosure.

FIGS. 20–25 illustrate another aspect of the present disclosure which is directed to an accessory 300 for use in cooperation with either of devices 10, 100 and thus with apparatus 150, 250. As shown in FIG. 20, accessory 300 may include a substantially ring shaped portion 302. As shown in isometric view in FIG. 21, ring shaped portion 302 includes two sections 306, 308 connected by fasteners 310 which are inserted into apertures 308. Section 308 includes and aperture 312 into which the fluid distribution tube 180 may be fixedly attached. As shown in FIGS. 22–23, section 306, 308 each have a substantially flat inner surface 314$a,b$ from which sloped surfaces 316$a,b$ and 318$a,b$ extend outwardly. Section 306 preferably has a substantially curved outer surface 320, whereas section 308 has a substantially flat outer surface 322.

Figure 24:
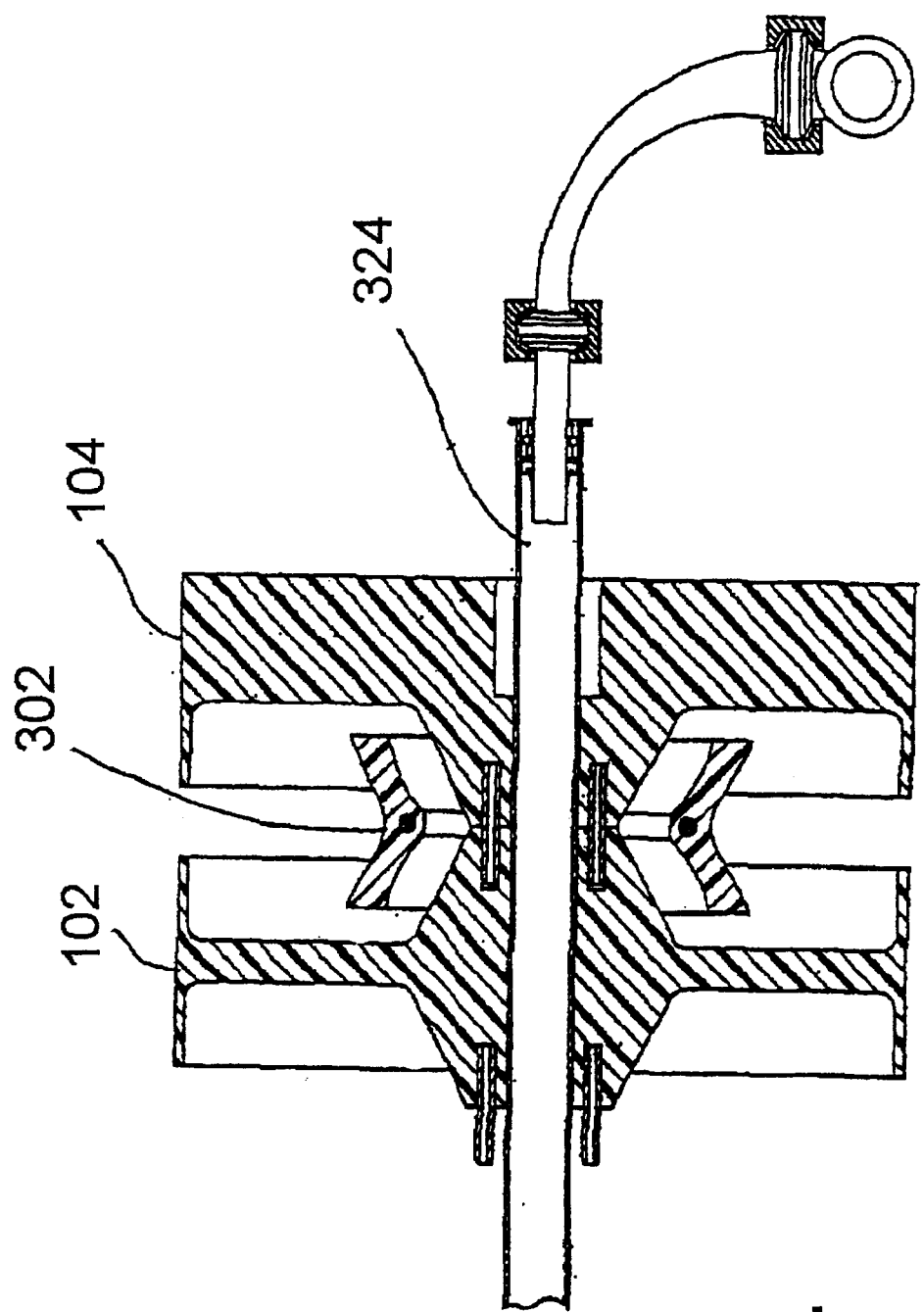
FIG. 24 shows a sectional view of the accessory of FIG. 20 in cooperative engagement with one embodiment of a rotary atomizer according to the present disclosure.
Figure 25:
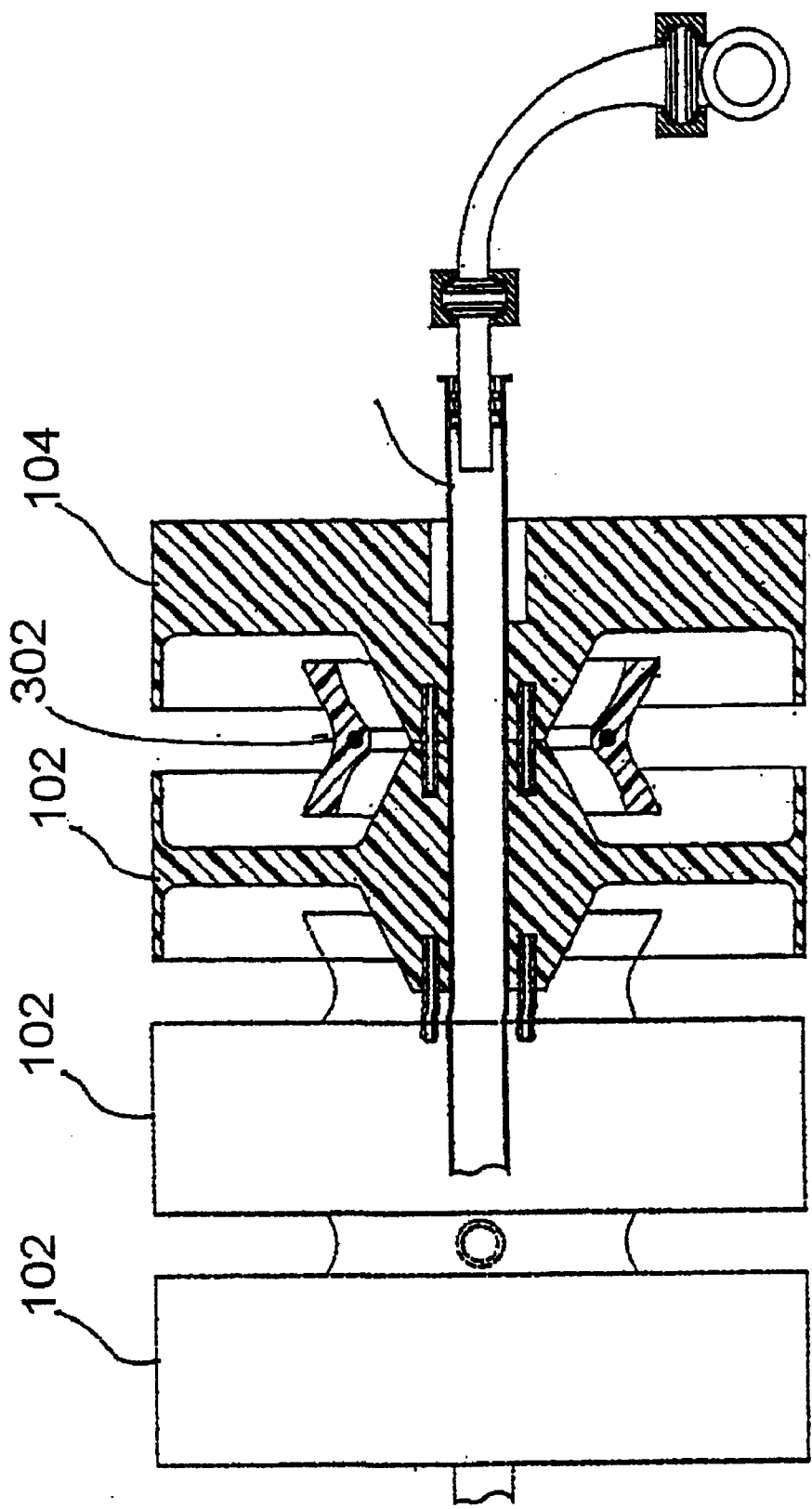
FIG. 25 shows a sectional view of the accessory of FIG. 20 in cooperative engagement with additional rotary atomizers according to the present disclosure.

FIGS. 24–25 illustrate one exemplary arrangement using ring-shaped portion 302 in cooperation with disc 102 and capping disc 104. As shown, discs 102, 104 may be mounted on a rotatable hollow drive shaft 324, which may be coupled to, for example, a fluid distribution manifold to receive fluid or batter in the hollow drive shaft 324. Discs 102,104 are connected by pins inserted into the apertures on each opposing side of discs 102,104. Before the pins are inserted, the ring-shaped portion 302 must be mounted about the frustoconical portion. Of course, although not illustrated herein, accessory 300 may also be disposed between discs 12*a,b* of device 10.

During operation of an apparatus, fluid is distributed directly from hollow drive shaft 324 to ring-shaped portion 302, which acts as a gutter to collect and distribute fluid to the interior surfaces of the rotating discs of devices 10, 100. Thus, any fluid that is distributed from the hollow drive shaft 324 and which is not immediately flung onto the cone or inner surfaces of the discs is collected. This prevents fluid that does not yet have the required momentum to be atomized from dripping onto the articles to be coated. Thus, accessory 302 effectively increases the dwell time within devices 10, 100, of fluid dispensed from fluid distribution tubes 180.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A rotary atomizer suitable for high-viscosity fluids, comprising:

(a) two opposed, identical atomizer assemblies, each further comprising:

(i) a disk-shaped backplate having a perimeter, an inner surface, and an outer surface; and (ii) a cylindrical flange, integrally attached to the inner surface at the backplate perimeter, and extending substantially perpendicularly outward therefrom; and (b) an axle extending coaxially through the first atomizer assembly and the second atomizer assembly, so that the flange of the first atomizer assembly extends toward the flange of the second atomizer assembly and in close proximity to it, and so that the backplate of each atomizer assembly is disposed perpendicular to the axle, and the axle is disposed perpendicular to the earth's gravitational force.

2. The rotary atomizer of claim 1, further comprising a central hub having two ends, the hub coaxially affixed at each end to a corresponding atozruzer assembly, and wherein the axle farther passes coaxially through the central hub.

3. A rotary atomizer suitable for high-viscosity fluids, comprising:
   (a) two identical end atomizer assemblies, each further comprising:
      (i) a disk-shaped backplate having a perimeter, an inner surface, and an outer surface; and
      (ii) a cylindrical flange, integrally attached to the inner surface at the backplate perimeter, and extending substantially perpendicularly outward therefrom;
   (b) a multiplicity of identical inner atomizer assemblies, each further comprising:
      (i) a disk-shaped backplate having a perimeter, an inner surface, and an outer surface; and
      (ii) a cylindrical flange, integrally attached to the backplate perimeter, and extending substantially perpendicularly outward an equal distance from both the inner surface and the outer surface;
   (c) an axle extending coaxially through the first end atomizer assembly, thence coaxially through all, of the inner atomizer assemblies, and thence coaxially through the second end atomizer assembly, which are arranged so that the flanges of each atomizer assembly extend toward the flange of an adjacent assembly, and in close proximity to it, arid so that the backplate of each atomizer assembly is disposed perpendicular to the axle, and the axle is disposed perpendicular to the earth's gravitational force.

4. The rotary atomizer of claim 3, further comprising a multiplicity of central hubs, each having two ends, and each hub coaxially attached at each end to a corresponding atomizer assembly, and wherein the axle further passes coaxially through all the central hubs.

5. The rotary atomizer of claims 2 or 4, and further comprising means to direct a liquid to be atomized in proximity to each hub so that, when the axle is rotated, the liquid further travels to the backplate and thence to the corresponding pair of flanges where the liquid is atomized.

6. The rotary atomizer of claim 5, wherein each atomizer assembly further includes a radius at an intersection of the interior surface of the backplate and an interior surface of the flange.

7. The rotary atomizer of claim 5, wherein each central hub has an outer surface that extends between the inner surfaces of each adjacent backplate and converges at a midpoint of the central hub to define an angle theta.

8. The rotary atomizer of claim 7, wherein each central hub comprises two portions that are symmetrical about the midpoint.

9. The rotary atomizer of claim 8, wherein each portion of each central hub further includes a plurality of apertures, each constructed and arranged to receive a fastener for fastening the corresponding backplates to the central hub.

10. The rotary atomizer of claim 9, wherein each portion of each central hub includes a face that is parallel to the adjacent backplate, and in which the plurality of apertures is disposed.

11. The rotary atomizer of claim 5, wherein each flange has a width ranging from about 1/4 inch to about 2 inch.

12. The rotary atomizer of claim 5, wherein each flange has a width ranging from about 3/4 inch to about 1 1/2 inch.

13. The rotary atomizer of claim 5, wherein each flange has a width of about 1 inch.

14. The rotary atomizing device of claim 9, wherein the angle θ ranges from about 30 degrees to about 60 degrees.

15. The device of claim 5, in combination with a gutter cooperatively disposed between each adjacent pair of discs.

* * * * *